United States Patent
Nizam

(10) Patent No.: US 11,432,912 B2
(45) Date of Patent: Sep. 6, 2022

(54) DENTAL IMPLANT ASSEMBLY

(71) Applicant: NOVODENT SA, Yverdon-les-Bains (CH)

(72) Inventor: Nejat Nizam, Karsiyaka-Izmir (TR)

(73) Assignee: NOVODENT SA, Yverdon-les-Bains (CH)

( * ) Notice: Subject to any disclaimer, the term of this patent is extended or adjusted under 35 U.S.C. 154(b) by 0 days.

(21) Appl. No.: 17/437,268

(22) PCT Filed: Mar. 10, 2020

(86) PCT No.: PCT/EP2020/056320
§ 371 (c)(1),
(2) Date: Sep. 8, 2021

(87) PCT Pub. No.: WO2020/182798
PCT Pub. Date: Sep. 17, 2020

(65) Prior Publication Data
US 2022/0039925 A1     Feb. 10, 2022

(30) Foreign Application Priority Data
Mar. 11, 2019 (EP) .................................... 19161962

(51) Int. Cl.
*A61C 8/00*     (2006.01)

(52) U.S. Cl.
CPC .......... *A61C 8/0069* (2013.01); *A61C 8/0066* (2013.01); *A61C 8/0068* (2013.01)

(58) Field of Classification Search
CPC .......... A61C 8/0048–0098; A61C 8/00; A61C 8/0028; A61C 8/0001; A61C 8/006
(Continued)

(56) References Cited

U.S. PATENT DOCUMENTS

2008/0261176 A1    10/2008    Hurson
2010/0119993 A1    5/2010    Schulter
(Continued)

FOREIGN PATENT DOCUMENTS

DE    102015100117       7/2016
DE    102015100117 A1 *   7/2016   ........... A61C 8/0045
(Continued)

OTHER PUBLICATIONS

International Search Report and Written Opinion issued by the International Searching Authority, dated Apr. 22, 2020, for International Patent Application No. PCT/EP2020/056320; 19 pages.

*Primary Examiner* — Nicholas D Lucchesi
*Assistant Examiner* — Mirayda A Aponte
(74) *Attorney, Agent, or Firm* — Faegre Drinker Biddle & Reath LLP

(57) ABSTRACT

Dental implant assembly comprising an implant with a body having an outer implant surface configured for osseointegration and a connection well, and an abutment comprising a prosthesis mounting portion for assembly of a dental prosthesis thereon and a connector mounting cavity. The assembly further comprises a connector comprising an implant mounting portion for assembly in the connection well of the implant, and an abutment mounting portion for assembly in the connector mounting cavity of the abutment, the abutment mounting portion of the connector comprising an index portion and the abutment connector mounting cavity further comprising an index cavity portion for receiving the index portion therein, the index portions configured to register the rotational orientation of the abutment about a longitudinal axis (A) with respect to the connector.

13 Claims, 3 Drawing Sheets

(58) Field of Classification Search
USPC ...... 433/172–174, 201.1; 606/264–265, 300, 606/301, 315, 217, 274, 59, 331
See application file for complete search history.

(56) References Cited

U.S. PATENT DOCUMENTS

| | | | |
|---|---|---|---|
| 2011/0306014 A1* | 12/2011 | Conte | A61C 8/005 433/173 |
| 2013/0143178 A1* | 6/2013 | van Ophuysen | A61C 8/0068 433/173 |
| 2015/0111175 A1* | 4/2015 | Thome | A61C 8/0089 433/174 |
| 2016/0166358 A1 | 6/2016 | Thome | |

FOREIGN PATENT DOCUMENTS

| | | |
|---|---|---|
| WO | 2000/02495 | 1/2000 |
| WO | 2003/059188 | 7/2003 |
| WO | 2006/017995 | 2/2006 |
| WO | 2019/036779 | 2/2019 |

* cited by examiner

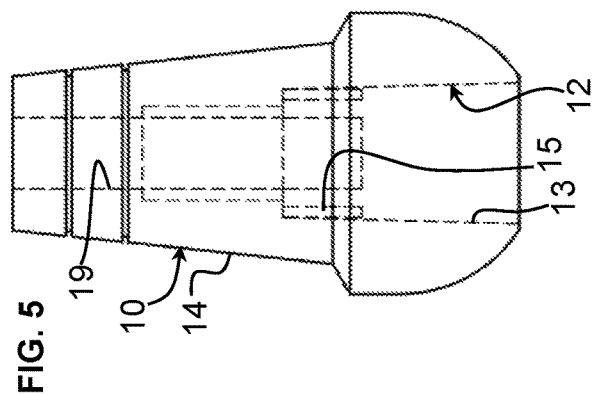
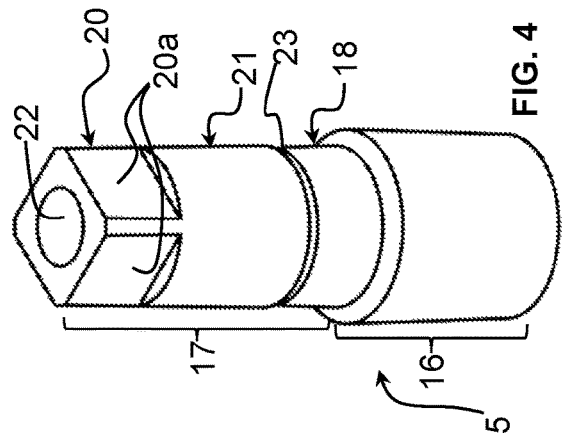
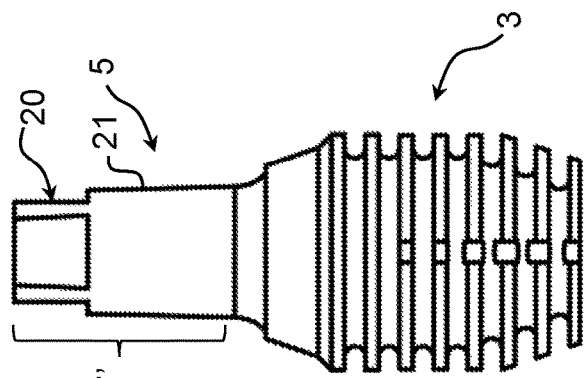
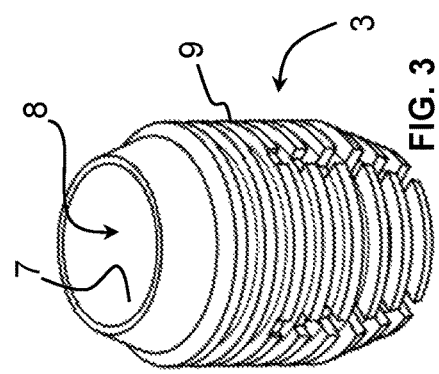
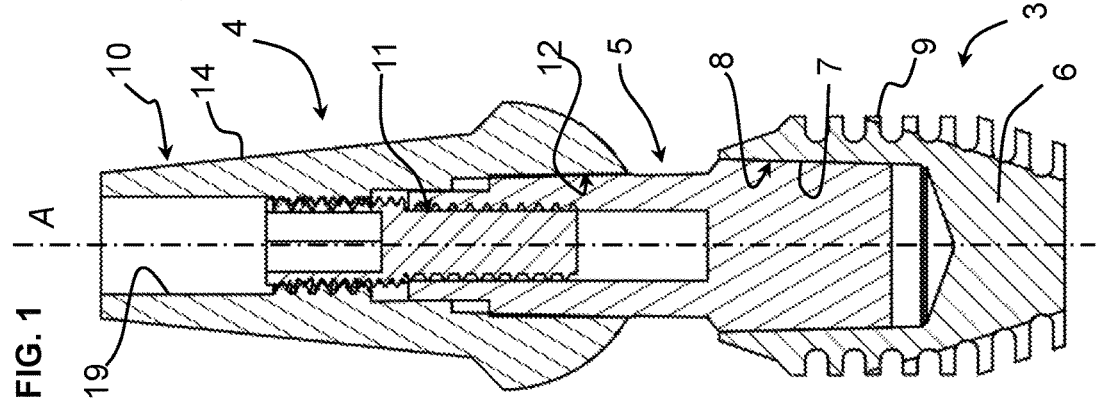

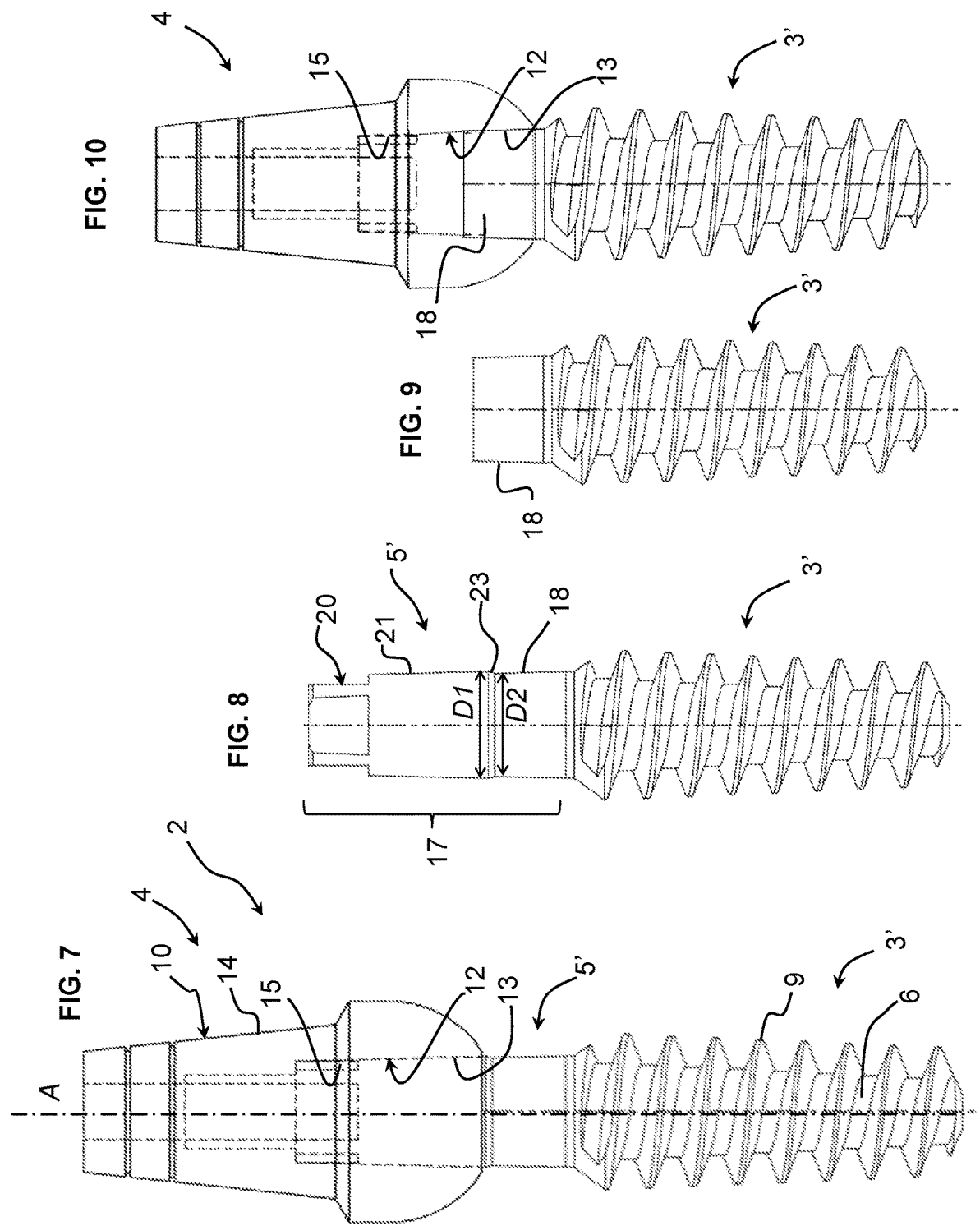

DENTAL IMPLANT ASSEMBLY

CROSS-REFERENCE TO RELATED APPLICATIONS

The present application is a national stage entry of International (PCT) Patent Application Number PCT/EP2020/056320, filed Mar. 10, 2020, which in turn claims priority to European Patent Application No. 19161962.6, filed Mar. 11, 2019, the subject matter of which are expressly incorporated herein by reference.

FIELD OF THE INVENTION

The present invention relates to a dental implant assembly for mounting a dental prosthesis, such as a tooth.

BACKGROUND

Conventional dental implants comprise an implant that typically comprises a screw that is implanted in the bone of a patient's jaw, the implant comprising a mounting portion for subsequent mounting of an abutment onto which a dental prosthesis, in particular an artificial tooth typically made of a ceramic material, may be mounted. The implant portion is mounted initially a few weeks or months prior to the assembly of the abutment and artificial tooth in order to allow osseointegration of the implant with the jaw bone. The implant typically comprises an outer mounting surface that is serrated, or comprises a screw thread, and may have a special coating to promote osseointegration. During the fitting of the prosthesis, it is typical that the abutment needs to be removed and put back multiple times. During removal and replacement, the surface of the abutment may be scratched. The abutment is typically held in the implant with a friction fit, whereby this friction fit may cause plastic deformation and micro welds at the mating surfaces. Removal and re-insertion of the abutment to the implant in a different rotational position may cause asperities to the formed in which bacteria may proliferate, which is of course undesirable.

The quality of the fit between the mounting surface of the abutment and the implant is thus of high importance.

Another problematic issue of implants occurs if the patient's bone or soft tissue recede and the abutment height needs to be corrected. Removal and replacement of the implant requires a surgical operation that is often undesirable.

SUMMARY OF THE INVENTION

In view of the fore-going, it is an object of the invention to provide a dental implant assembly that allows an accurate and tight fit between an abutment and an implant and that allows easy assembly and disassembly.

In view of the fore-going, another object of the invention to provide a dental implant assembly that allows adjustment of the abutment height with minimal consequences on the patient.

It is advantageous to provide a dental implant assembly that is versatile, in particular that allows various implants to be assembled to various abutments in an economical manner.

Objects of this invention have been achieved by providing the system according to claim 1.

Disclosed herein is a dental implant assembly comprising an implant with a body having an outer implant surface configured for osseointegration and an abutment comprising a prosthesis mounting portion for assembly of a dental prosthesis thereon.

According to a first aspect, the assembly further comprises a connector comprising an implant mounting portion for assembly in a connection well of the implant, and an abutment mounting portion for assembly in a connector mounting cavity of the abutment, the abutment mounting portion of the connector comprising an index portion and the abutment connector mounting cavity further comprising an index cavity portion for receiving the index portion therein, the index portions configured to register the rotational orientation of the abutment about a longitudinal axis with respect to the connector. The abutment mounting portion of the connector may further comprise an upper conical attachment portion for mounting to a complementary conical cavity portion of the connector mounting cavity of the abutment.

According to a second aspect, the assembly comprises a connector portion integrally formed with the implant, the connector portion comprising an abutment mounting portion for assembly in a connector mounting cavity of the abutment. The abutment mounting portion of the connector portion comprises a conical upper attachment portion and a conical lower attachment portion connected to the upper attachment portion via a stepped transition such that an upper end of the conical lower attachment portion has a smaller diameter than a lower end of the conical upper attachment portion, whereby the conical upper attachment portion comprises a cone taper angle configured for friction fit mounting in the connector mounting cavity of the abutment, and the lower attachment portion comprises a cone taper angle configured for friction fit mounting in the connector mounting cavity of the abutment when the upper attachment portion is cut off. The abutment mounting portion of the connector portion may further comprise an index portion and the abutment connector mounting cavity further comprises an index cavity portion for receiving the index portion therein, the index portions configured to register the rotational orientation of the abutment about a longitudinal axis with respect to the connector In an advantageous embodiment, the conical attachment and cavity portions comprise conical surfaces with a cone taper angle of between 1 degree and 6 degrees, preferably between two degrees and four degrees, for instance about three degrees.

In an advantageous embodiment, the implant mounting portion of the connector, and the connection well of the implant comprises a conical surface with a cone taper angle of between one degree and six degrees, preferably between two degrees and four degrees, for instance, about three degrees.

In an advantageous embodiment, the index portion of the connector comprises at least one index surface.

In an advantageous embodiment, said at least one index surface is flat.

In an advantageous embodiment, the index portion of the connector comprises a plurality of index surfaces, for instance forming a substantially square index portion.

In variants, the index portion may also be formed of a curved surface, or by a non-axisymetric shape of the index portion, for instance provided with an oval shape.

In an advantageous embodiment, the connector or connector portion comprises a screw hole with a threaded portion configured to engage a thread of an assembly screw inserted through a longitudinal screw hole in the abutment for receiving the assembly screw.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which:

FIG. 1 is a cross-sectional view of a dental implant assembly according to an embodiment of the invention;

FIG. 2 is a view of a portion of the dental implant assembly comprising an implant and a connector according to another variant mounted thereto;

FIG. 3 is a perspective view of an implant of the dental implant assembly of FIG. 1;

FIG. 4 is a perspective view of a connector of the dental implant assembly of FIG. 1;

FIG. 5 is a side view showing in dotted lines an inside of an abutment of the dental implant assembly of FIG. 1;

FIG. 7 is a side view of a dental implant assembly according to another embodiment of the invention;

FIG. 8 is a side view of an implant with integrated connector of the dental implant assembly of FIG. 7;

FIG. 9 is a side view of an implant of FIG. 7 with a portion of the integrated connector cut off;

FIG. 10 is a side view of a dental implant assembly according to an embodiment of the invention showing an abutment mounted to the implant of FIG. 9.

DETAILED DESCRIPTION OF EMBODIMENTS OF THE INVENTION

Figure 6:
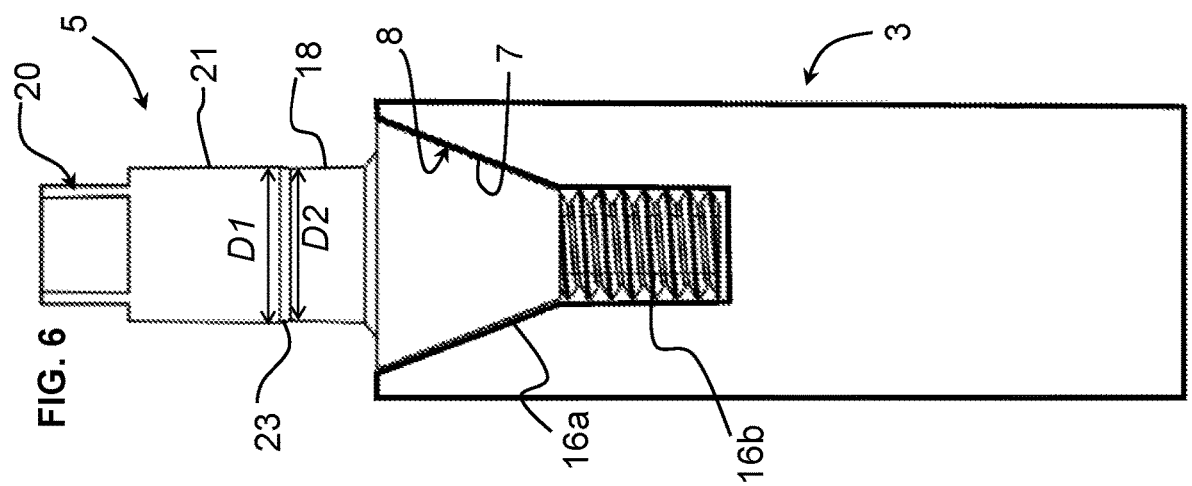
FIG. 6 is a side view of a connector of a dental implant assembly according to another embodiment of the invention shown schematically mounted to an implant.

Referring to the figures, in particular FIGS. 1 to 5, the dental implant assembly 2 comprises an implant 3, an abutment 4, and a connector 5 interconnecting the implant 3 to the abutment 4.

The implant 3 comprises an outer implant surface 9 configured to be inserted in a bone structure of a patient, in particular in a jaw bone, forming an anchor for fixing a dental prosthesis, in particular an artificial tooth such as a ceramic tooth. The shape materials and outer surface properties of the dental implant 3 may be made according to conventional designs of dental implants and do need not be described in further detail. It may be noted that the shape and dimensions of the implant 3, in particular the outer implant surface 9 thereof, may depend on the specific use and implementation, including on the physiological conditions of the patient and the chosen assembly method of the implant in a bone structure of the patient.

In the embodiments illustrated in FIGS. 1 to 3, the outer implant surface 9 has horizontal ridges and grooves and some vertical grooves intended for securely anchoring the implant in the bone structure and allowing good osseointegration. However it is also known to provide implants with various other forms and shapes, including for instance a screw thread.

The shape and form of the outer implant surface may depend also on the manner of assembly of the implant in the jaw bone and the tooth that is used. Typically, in an implant procedure, the dental implant 3 is implanted in the bone structure of a patient in a first step without other components of the implant assembly in order to allow osseointegration to take place to securely anchor the implant in the bone structure prior to exercising mechanical forces thereon.

Typically after a few weeks or more once the bone has healed and the implant is securely anchored, the prosthetic stage may take place in which the dental surgeon assembles the abutment and the tooth prosthesis. During this prosthesis stage, it may be necessary for the dental surgeon to assemble and remove more than once the abutment to make adjustments to the dental prosthesis. The abutment may also be fitted in order to take a mold of the abutment and space therearound for shaping and manufacturing the prosthesis, whereby after this measuring step the abutment is removed until the prosthesis is made and can then be finally fitted.

The body 6 of the implant 3 comprises a connection portion which in the illustrated embodiment is in the form of a connection well 8 into which an implant mounting portion 16 of the connector 5 is inserted. The connection well comprises a conical mounting surface 7 with a conical taper angle of between 1 and 6 degrees preferably in a range of 2 to 4 degrees for instance around 3 degrees. The taper angle of the conical mounting surface 7 serves to allow a cold friction fit with the implant mounting portion 16 and the connector 5 inserted therein.

For clarity, it should be noted that the conical taper angle mentioned herein is defined as the maximum angle between opposite sides of the cone, i.e. double the angle of inclination of the tapered surface with respect to the longitudinal axis A.

The abutment 4 comprises a prosthesis mounting portion 10 for mounting a prosthetic tooth thereon, for instance a ceramic tooth. The prosthesis mounting portion comprises a mounting surface 14 that may typically have a conical tapered surface that may include various features such as horizontal circular grooves or index portions to prevent rotation of the prosthetic tooth on the abutment. The shapes forms and geometric dimension of the mounting surface 14 of the abutment may vary according to the implementation and have various conventional shapes sizes and proportions that are known in the art of dental implant assemblies.

The abutment 4 further comprises a connector mounting cavity 12 in which an abutment mounting portion 17 of the connector 5 is inserted. The abutment 4 may optionally further comprise a screw hole 19 extending therethrough for optionally receiving an assembly screw 11 that securely fixes the abutment 4 to the connector 5.

The connector 5 comprises an implant mounting portion 16 that may be inserted in the connection well 8 of the implant 3, and an abutment mounting portion 17 that is inserted in a connector mounting cavity 12 of the abutment 4. The connector 5 may optionally further comprise a screw hole 22 with a threaded portion that engages a complementary threaded portion of the optional assembly screw 11 to allow the abutment 4 to be tightly coupled to the connector 5 with the tightening of the assembly screw 11. The abutment may however be attached to the connector only via a cold friction fit.

The abutment mounting portion 17 of the connector 5 comprises an attachment portion 21 having an outer conical surface with a cone taper angle that is in a range of 1 to 6 degrees, preferably in a range from 2 to 4 degrees, for instance around 3 degrees, and the abutment 4 has an attachment cavity portion 13 with a complementary conical mating surface with the same cone taper angle as the attachment portion 21 of the connector to allow the connector and abutment to be fitted together and securely attached in a cold friction fit when the assembly screw 11 is tightened. The angle of the taper is such that the friction fit may be released by pulling apart with a certain specified disassembly force the abutment 4 from the connector 5. The angle may be such that the friction fit occurs without the force of the assembly screw 11. The assembly screw 11 may also have an end that when fully threaded pushes on a bottom surface of the screw hole 22 in the connector 5 to assist separation of the connector from the abutment when disassembly is required (variant not illustrated).

The abutment mounting portion 17 of the connector 5 further comprises an index portion 20, and the connector mounting cavity 12 of the abutment 4 comprises a complementary indexed cavity portion 15 receiving the connector index portion 20 therein. The index portions comprise a non-axisymmetrical shape that blocks rotation and indexes the rotational position of the abutment 4 with respect to the connector 5 about the longitudinal axis A. In the illustrated embodiment, the index portion 20 comprises at least one index surface 20a, which may preferably be a flat surface, the illustrated embodiment having a plurality of index surfaces forming in the illustrated embodiment a generally square profile. Other profiles such as triangular, pentagonal, hexagonal, or irregular profiles may be however provided.

The index portion 20 and the complementary cavity portion 15 ensure that the abutment 4 and connector 5 are connected together in a defined angular orientation, and that this angular orientation may be maintained even when the abutment 4 is disassembled from the connector 5 and subsequently assembled one or more times. This advantageously ensures that any micro asperities and plastic deformations that occur when effecting the cold friction fit between the attachment cavity portion 13 and attachment portion 21 of the connector 5 are realigned during assembly, thus improving the tightness of the fit between the abutment and the connector 5 and implant 3 to avoid micro channels and asperities in which microorganisms may proliferate.

The provision of the connector 5 for assembly to the implant 3 allows the implant 3 to have various shapes and sizes and to be sunk in the patient's bone without protruding parts on which forces may be exerted that could adversely affect osseointegration.

Moreover, the provision of the connector 5 for assembly to the implant 3 allows the connector 5 to have various shapes and sizes, and in particular different heights for adjustment to a patient's bone and soft tissue configuration, for instance depending on the thickness of the patient's soft tissue relative to the bone. As illustrated in FIG. 2 the abutment mounting portion 17' has a lower height than the abutment mounting portion 17 of the embodiment of FIGS. 1 and 4. An abutment mounted on the connector of FIG. 2 will thus be closer to the implant 3 than in the variant of FIG. 1.

The connector 5 however may be secured and assembled to the implant 3 with the cold friction fit once osseointegration of the implant has been completed and forces may be exerted on the implant while allowing assembly and disassembly of the abutment 4 and prosthesis during the prosthesis production, fitting and adjustment procedures.

In a first variant, the cone taper angles may be the same for both the connector to abutment fit and the implant to connector fit. In order to disassemble the abutment, a remover component may be used which applies an axial removal force to the abutment but a rotational force to the connector, which allows the abutment to be removed but not the connector.

In a second variant, a smaller taper angle between the implant and connector than between the connector and abutment may be provided such that the connector to implant attachment has a stronger friction fit than the connector to abutment attachment.

The connector in the variant of FIGS. 1 to 5 is assembled to the implant 3 with a cold friction fit. In variants, it is possible to have other fixing mechanism between the connector 5 and the implant 3. For instance, as illustrated in FIG. 6, the connector 5 is provided with a conical implant mounting portion 16a and extending therefrom a screw portion 16b engaging a complementary threaded screw hole in the implant 3 for a screw connection of the connector 5 to the implant 3, whereby the conical portion may also engage the complementary conical surface of the implant in a cold friction fit.

As illustrated in FIG. 4, the abutment mounting portion 17 of the connector 5 may comprise a lower second attachment portion 18, connected to the upper first attachment portion 21 via a stepped transition 23, in which the diameter D1 of the bottom end of the upper portion 21 is greater than the diameter D2 of the top end of the lower portion 18. The lower attachment portion 18 preferably comprises the same diameters and cone taper angle than the upper attachment portion 21 such that when the upper attachment portion 21 and index portion 20 is cut off, the lower attachment portion 18 may be inserted in the connector mounting cavity 12 of the same abutment 4 or with an abutment 4 having the same mounting cavity dimensions. In a variant however, the lower attachment portion 18 may comprise different diameters and/or cone taper angle than the upper attachment portion 21, for mounting in an abutment with corresponding angle and dimensions. The foregoing features advantageously allows the index portion 20 and the attachment portion 21 to be cut off in order to leave only the second conical attachment portion 18, such procedure occurring for instance when a tooth prosthesis is replaced during the life time of the dental implant assembly. The latter allows mounting of a new prosthesis without surgical removal of the implant 3, while lowering the abutment 4 for instance because of soft tissue recession.

Referring now to FIGS. 7 to 10, a second embodiment of a dental implant assembly is illustrated.

In this embodiment, the connector 5' is integrated as a single piece with the implant 3'. The connector 5' comprises an abutment mounting portion 17 comprising an index portion 20, an upper attachment portion 21 and a lower attachment portion 18 as described in relation to the first embodiment, and the implant 3' comprises an outer implant surface 9, which in this embodiment is shown as a screw type implant, such screw type implant surfaces being per se known in the art.

The abutment 4 may be the same or have a similar construction as previously described for attachment to the abutment mounting portion 17 of the connector portion 5'.

As illustrated in FIG. 9 compared to FIG. 8, the connector 5' may have an upper portion comprising the index portion 20 and the attachment portion 21 cut off in order to leave only the conical lower attachment portion 18, such procedure occurring for instance when a tooth prosthesis is replaced during the life time of the dental implant assembly. The latter feature allows mounting of a new prosthesis without surgical removal of the implant 3', while lowering the abutment 4 in case of soft tissue recession, as previously described.

LIST OF REFERENCES IN THE DRAWINGS:

Prosthesis (crown)
Dental Implant assembly 2

Implant 3
  Body 6
    Outer implant surface 9
      Ridges
      Grooves
    Connection portion
      Connection well 8
        Mounting surface 7
Abutment 4
  Prosthesis mounting portion 10
    Mounting surface 14
  Connector mounting cavity 12
    Attachment cavity portion 13
    indexed cavity portion 15
  Screw hole 19
Connector 5
  Implant mounting portion 16
    Conical taper portion 16a
    Screw portion 16b
  Abutment mounting portion 17
    Index portion 20
      Index surfaces 20a
    (Upper) attachment portion 21
    Lower attachment portion 18
    Transition step 23
  Screw hole 22
    Threaded portion
Assembly Screw 11

The invention claimed is:

1. A dental implant assembly comprising:
an implant with a body having a connection well and an outer implant surface configured for osseointegration;
an abutment comprising:
  a prosthesis mounting portion for assembly of a dental prosthesis thereon and
  a connector mounting cavity;
a connector comprising:
  an implant mounting portion for assembly in the connection well of the implant, and
  an abutment mounting portion for assembly in the connector mounting cavity of the abutment, the abutment mounting portion of the connector comprising an index portion, the index portion configured to register the rotational orientation of the abutment about a longitudinal axis (A) with respect to the connector,
wherein the connector mounting cavity of the abutment further comprises an index cavity portion for receiving the index portion therein,
wherein the abutment mounting portion of the connector further comprises an upper conical attachment portion for mounting to a complementary conical cavity portion of the connector mounting cavity of the abutment and a lower conical attachment portion connected to the upper conical attachment portion via a stepped transition, whereby the lower conical attachment portion comprises a cone taper angle configured for friction fit mounting in the connector mounting cavity of the abutment when the upper conical attachment portion is cut off resulting in a lower height of the dental implant assembly.

2. The dental implant assembly according to claim 1, wherein the upper conical attachment portion, lower conical attachment portion, and complementary conical cavity portion comprise conical surfaces with a cone taper angle of between 1 degree and 6 degrees.

3. The dental implant assembly according to claim 1, wherein said cone taper angle is 3 degrees.

4. The dental implant assembly according to claim 1, wherein the implant mounting portion of the connector, and the connection well of the implant each comprises a conical surface with a cone taper angle of between 1 degree and 6 degrees.

5. The dental implant assembly according to claim 4, wherein said cone taper angle is 3 degrees.

6. The dental implant assembly according to claim 1, wherein the index portion of the connector comprises at least one index surface.

7. The dental implant assembly according to claim 6, wherein said at least one index surface is flat.

8. The dental implant according to claim 6, wherein the index portion of the connector comprises a plurality of index surfaces, for instance forming a square index portion.

9. The dental implant assembly according to claim 1, wherein the connector comprises a screw hole with a threaded portion configured to engage a thread of an assembly screw inserted through a longitudinal screw hole in the abutment for receiving the assembly screw.

10. A dental implant assembly comprising:
an implant having an outer implant surface configured for osseointegration;
a connector portion integrally formed with the implant; and
an abutment comprising:
  a prosthesis mounting portion for assembly of a dental prosthesis thereon and
  a connector mounting cavity,
wherein the connector portion comprises an abutment mounting portion for assembly in the connector mounting cavity of the abutment, wherein the abutment mounting portion of the connector portion comprises a conical upper attachment portion and a conical lower attachment portion connected to the upper attachment portion via a stepped transition, such that the diameter (D1) of the bottom end of the upper attachment portion is greater than the diameter (D2) of the top end of the lower attachment portion, whereby the conical upper attachment portion comprises a cone taper angle configured for friction fit mounting in the connector mounting cavity of the abutment, and the lower attachment portion comprises a cone taper angle configured for friction fit mounting in the connector mounting cavity of the abutment when the upper attachment portion is cut off.

11. The dental implant assembly according to claim 10, wherein the cone taper angle of the lower attachment portion is the same as the cone taper angle of the upper attachment portion.

12. The dental implant assembly according to claim 11, wherein the cone taper angle is between 1 degree and 6 degrees.

13. The dental implant assembly according to claim 10, wherein the connector portion comprises an index portion and the abutment connector mounting cavity further comprises an index cavity portion for receiving the index portion therein, the index portions configured to register the rotational orientation of the abutment about a longitudinal axis (A) with respect to the connector portion.

\* \* \* \* \*